US011366857B2

(12) United States Patent
Rodriquez et al.

(10) Patent No.: US 11,366,857 B2
(45) Date of Patent: Jun. 21, 2022

(54) ARTIFICIAL INTELLIGENCE COMMUNICATIONS AGENT

(71) Applicant: Directly, Inc., San Francisco, CA (US)

(72) Inventors: Jamasen Rodriquez, San Francisco, CA (US); Sinan Ozdemir, San Francisco, CA (US)

(73) Assignee: Directly, Inc., San Francisco, CA (US)

( * ) Notice: Subject to any disclaimer, the term of this patent is extended or adjusted under 35 U.S.C. 154(b) by 253 days.

(21) Appl. No.: 16/544,221

(22) Filed: Aug. 19, 2019

(65) Prior Publication Data

US 2020/0065334 A1 Feb. 27, 2020

Related U.S. Application Data

(60) Provisional application No. 62/720,740, filed on Aug. 21, 2018.

(51) Int. Cl.
  *G10L 15/06* (2013.01)
  *H04M 3/51* (2006.01)
  *G06F 16/9032* (2019.01)

(52) U.S. Cl.
  CPC ...... *G06F 16/90332* (2019.01); *G10L 15/063* (2013.01); *H04M 3/5183* (2013.01); *G10L 2015/0631* (2013.01)

(58) Field of Classification Search
  CPC .......... G10L 15/063; G10L 2015/0631; H04M 3/5183; G06F 16/903332
  See application file for complete search history.

(56) References Cited

U.S. PATENT DOCUMENTS

| 10,382,370 | B1* | 8/2019 | Labarre | H04L 51/02 |
| 10,963,819 | B1* | 3/2021 | Gangadharaiah | G06F 40/56 |
| 2019/0043483 | A1* | 2/2019 | Chakraborty | G06N 3/006 |
| 2019/0180746 | A1* | 6/2019 | Diwan | G10L 15/22 |
| 2019/0265990 | A1* | 8/2019 | Hall | G06F 11/3672 |
| 2021/0192127 | A1* | 6/2021 | Imanishi | G06F 40/289 |

OTHER PUBLICATIONS

Hsu, C., W., et al. "A Practical Guide to Support Vector Classification," Technical Report, Dept. of Computer Science and Information Engineering, National Taiwan University, Taipei, 2010.
Platt, J., "Sequential Minimal Optimization," Microsoft Research, Technical Report MSR-TR-98-14, 1998.

* cited by examiner

*Primary Examiner* — Sonia L Gay
(74) *Attorney, Agent, or Firm* — Rimon Law, P.C.

(57) ABSTRACT

Systems and methods for artificial intelligence communications agents are disclosed. Implementations relate to capturing individual agent's behaviors and modelling them in artificial intelligence (AI) learning models so that the agent's behavior can be easily replicated. Some implementations further relate to systems and methods for capturing human-computer interactions (HCI) performed by agents and using robotic process automation (RPA) to automate tasks that would otherwise require human interaction. The combination of AI learning models and RPA are used to provide artificial intelligence communications agents capable of responding to a variety of topics of conversation over a variety of communication mediums.

20 Claims, 11 Drawing Sheets

Table 1

Agent [09:34]: Hello my name is Jane. How can I help you?

Customer [09:35]: Hi Jane. Sorry I'm late. I'm looking to pay my bill.

Agent [09:37]: I can help you with that. May I ask you a few verification questions so I can open your account and help you with that?

Customer [09:37]: Sure

Agent [09:39]: What is your account number?

Customer [09:40]: I don't have that, is there another way you can pull me up?

Agent [09:41]: Yes. Can I get your name and the last four digits of your social?

Customer [09:41]: Yes. My name is John Doe and the last four of my social are 1234.

Agent [09:43]: Thank you. One moment while I pull that up.

Agent [09:44]: For verification purposes can you tell me your address?

Customer [09:45]: 123 Awesome St., San Francisco, CA 94108.

Agent [09:48]: Thank you John. I see you are past due $132.56 for June. That includes the late fee. Are you looking to pay that full amount?

Customer [09:48]: Yes.

Agent [09:50]: Would you also like to pay July's payment now in the amount of $102.56?

Customer [09:52]: No, I can only pay June's payment right now.

Agent [09:55]: Ok. I see you have a payment method saved on your account. Would you like to use that account or another?

Table 2

[09:34]: Chat window opens for agent.

[09:34]: Agent types greeting in chat window.

[09:37]: Agent types response in chat window.

[09:39]: Agent types question in chat window.

[09:41]: Agent types question in chat window.

[09:43]: Agent opens CRM and inputs customer information. Customer account is pulled up in system.

[09:44]: Agent types verification question in the chat window.

[09:46]: Agent reviews customer address in CRM and confirms it matches what customer put in the chat window.

[09:47]: Agent navigates to billing information on customer's account in the CRM. Agent verifies how many days the customer is past due. Confirms it is less than 30 days.

[09:48]: Agent types response in chat window.

[09:49]: Agent reviews current/upcoming payment in CRM.

[09:50]: Agent types question in chat window.

[09:53]: Agent checks if customer has a payment method saved in CRM.

[09:55]: Agent types response/question in chat window.

FIG. 9A

Table 3

Past Due Policy:
- If account is less than 90 days late agent can take payment.
- If account is over 90 days late transfer to collections department.
- Policy guidelines around waiving late fees.

Verification Requirements Policy:
- Provides requirements based on what the customer is trying to do what verification requirements are.
    - Ex. Making Payment
        - Account # & Name
        - Last 4 of SSN & Name & Address
    - Ex. Change Subscription Plan
        - Account # & Name PLUS Last 4 of SSN OR Address

Table 4

Kylie: Hello this is Kylie. How can I help you?

Customer: I'm looking to pay my bill/I need to pay my bill/I want to make a payment Kylie: Ok. I can help you _____. May I ask you a few verification questions so I can open your account and help you with that?

Customer: Sure/Yes

Kylie: What is your account number?

Customer: I don't have that, is there another way you can pull me up?

Kylie: Yes. Can I get _____.

Customer: Yes. My name is John Doe and the last four of my social are 1234.

Kylie: For verification purposes can you tell me _____?

Customer: 123 Awesome St., San Francisco, CA 94108.

Kylie: Thank you {CustomerName}. I see your current balance is ${AccountBalance}. Are you looking to pay this amount in full?

Customer: Yes.

Kylie: Would you also like to make your upcoming payment of ${NextInvoiceAmt}?

Customer: No.

Kylie: Ok. Would you like to use the payment method you have saved?

FIG. 9B

ARTIFICIAL INTELLIGENCE COMMUNICATIONS AGENT

CROSS-REFERENCE TO RELATED APPLICATIONS

This application claims benefit of priority to U.S. Provisional Patent Application No. 62/720,740 filed on Aug. 21, 2018, which is hereby incorporated by reference in its entirety.

BACKGROUND

Customer service refers to a wide variety of communication that customers may have with a company or other organization to perform a wide range of tasks. For example, customers may call in to a company call center to request information on purchases, return items, update their information, or any variety of such tasks. Technology has long played a role in delivering better customer service by companies more efficiently. The development of the touch-tone phone gave rise to the ubiquitous interactive voice response (IVR) system which allows callers to interact with computing systems by DTMF tones input by a telephone keypad. Companies have long used IVR systems comprising labyrinthine decision trees of voice prompts and endless options. Many customer service interactions may also be provided by an internet system as well, removing the need for a dedicated staff to answer and respond to inquiries. However, both IVRs and internet-based systems are generally rigid and require manual configuration and development. These systems may be efficient to develop for some basic and recurring tasks but may also be difficult or too expensive to adapt to changing business or customer needs. In addition, some people continue to prefer to converse with an agent rather than navigate a rigid IVR or website to find what they need. For these reasons and more, human operators are still a necessity for many organizations who want to provide high quality support to customers.

BRIEF DESCRIPTION OF THE DRAWINGS

The present disclosure will become more fully understood from the detailed description and the accompanying drawings, wherein:

FIGS. 9A and 9B illustrate Tables 1-4 related to the flow diagram of FIG. 3, according to some implementations.

DETAILED DESCRIPTION

Figure 1A:
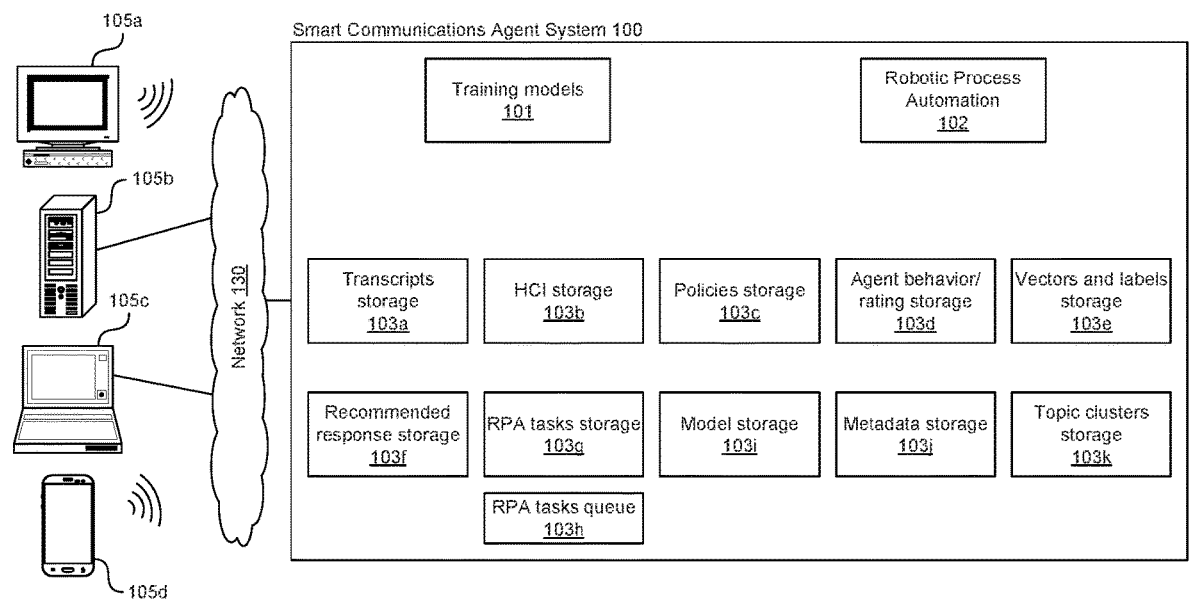
FIG. 1A is a block diagram illustrating components of a smart communications agent system in some implementations.

Systems and methods for smart communications agent system, and more specifically systems and methods for recreating human customer service support agent's behavior in an artificial intelligence system are disclosed. Implementations of the smart communications agent system described below may be able to satisfy a significant portion of customer's needs while being much more efficient to implement than a custom rules-based system. In some examples, artificial intelligence communications agents can achieve up to 80% success rates while being implemented in a matter of days. Furthermore, the implementations described herein can automatically capture arbitrary business processes based on actual human customer service agent actions, providing greater levels of transparency for all levels of a customer service operation and more efficient implementation compared to previously known approaches.

In some implementations, individual customer service agent's behaviors are captured and modelled using dedicated machine learning models so that their behavior can be easily replicated among many customers. In this way, these implementations may be said to 'clone' the agent's behaviors. This allows customer service organizations to efficiently identify and replicate best practices among their customer service operation to improve customer outcomes beyond other automation solutions. For instance, a smart communications agent system collects communication transcripts from an organization. For example, the smart communications agent system collects chat records (between customers and agents of a bank) recorded by the bank to provide details of customers' accounts such as the balance, travel notifications, previous purchases, and so on. The smart communications agent system collects the transcripts of these chats along with metadata, if available, about each chat and policies of the bank. The metadata may include account number, time of day, time zone, agent name who answers the question, a mapping to a unique customer identifier used internally by the bank's computer systems, and so on. The policies may be, for example, when a customer is providing notification of a travel, the last four digits of the Social Security number, the destination city, and time of travel are needed. In addition, the smart communication agent system can collect human computer interaction by recording the interactions between an agent of the bank and the computer systems and correlating the interactions with the various portions of a chat.

Once the training data is collected and/or provided by a bank, the smart communications agent system clusters the training data so that chats directed to similar topics are in the same clusters. The smart communications agent system then generates a feature vector for each chat. For example, the feature vector may have a term frequency-inverse document frequency features, metadata features such as length of questions, punctuations, and so forth. Once the feature vectors are generated, then a dimension reduction can be applied using singular valued decomposition or principal component analysis. The feature vectors can be automatically labeled as positive or negative examples or have a work rating score applied based on the agent who was involved with the chat. For example, a highly regarded agent may have a 100-score included in each feature vector for that agent, whereas a poorly regarded agent may have a very low value score included in each feature vector for that agent. The feature vectors can be labeled with things such as what is the next thing the agent stated and another label can be what is the human computer interface and her action that the agent performed.

The smart communications agent system can apply various types of machine learning techniques on these feature vectors and their labels. The machine learning techniques can be linear regression, Bayesian inference, support vector machine, neural network, and so on. These models can then be ranked based on their accuracy, average time to provide an answer, and so on.

When a model is used, the smart communications agent system generates a feature vector based on a received query or last communication in the chat provided by a customer. The smart communications agent system then selects and uses a model to determine what is the next best thing to say and what should be the computer interactions (robotic process automation (RPA) tasks). For example, the next best thing to say can be provided by the smart communications agent system as a response to the bank's customer. The smart communications agent system can store the computer interactions to be performed (RPA tasks) in a queue. For example, if the results say that the travel notice will be in effect for up to a certain date, then the date may be retrieved from the computer interactions and provided as the response in the chat. This allows automation of tasks that otherwise would require human interaction while simultaneously surfacing best practices among human agents.

In this way, a customer service delivery center (e.g., a "call center") may develop and train many models to handle various aspects of delivery high quality customer service over a variety of mediums. For example, a call center may train models for a variety of communications mediums such as voice calls, text messages, chat messages, emails, smart device communications. Each model may also be specialized for a given task, such as resetting passwords for customers or processing a return request. This level of specialization produces AI models which can accurately and efficiently handle their tasks as compared to a general-purpose model. The combination of AI learning models and RPA are used to provide artificial intelligence communications agents capable of responding to a variety of topics of conversation over a variety of communication mediums.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology, and can be included in more than one implementation. In addition, such phrases do not necessarily refer to the same implementations or different implementations.

FIG. 1A is a block diagram illustrating components of a smart communications agent system in some implementations. The smart communications agent system 100 can include various modules of components 101-102 that implement the smart communications agent system and various data storages 103a-103k to store data relating to the recommended responses. A training models component 101 controls the overall process of collecting and processing transcripts and human computer interaction (HCI) to train models. The training models component 101 is discussed in detail below with reference to FIGS. 1B-4. A robotic process automation component 102 controls the overall process of applying the trained models to generate a recommended response and RPA tasks in response to a received query. The robotic process automation component 102 is discussed in detail below with reference to FIGS. 5-8. The smart communications agent system 100 communicates with client computing devices 105A-D, via network 130, to receive transcripts, HCI actions, policies, queries, and so on, as well as transmit recommended responses to queries. In some implementations, a pre-processing agent can pre-select the HCI actions and transcripts received by the smart communications agent system based on certain criteria. For example, the pre-processing agent can filter the HCI actions and transcripts for a particular agent and/or for a particular task for which the agent has a reputation for quality.

The data storages include a transcripts storage 103a, a HCI storage 103b, a policies storage 103c, an agent behavior/ratings storage 103d, a vectors and labels storage 103e, a recommended response storage 103f, a RPA tasks storage 103g, a RPA tasks queue 103h, a model storage 103i, a metadata storage 103j, and a topic clusters storage 103k. The transcripts storage 103a stores transcripts or any other communications exchanged between customers and customer service representatives. Transcripts can be transcripts of any communication over any medium. For example, transcripts can be audio recordings of telephone conversations, text transcriptions of audio recordings, emails, SMS text messages, short-form text messages of any other kind, social media interactions such as TWITTER® interactions, commands received from smart devices such as Alexa®, or any other recording of communications in any format or structure. In some implementations, transcripts can comprise transcribed recordings of a customer support call center. Alternatively, or additionally, transcripts comprise several months of such recordings from a plurality of customer support agents or representatives that are captured as a regular business practice of some customer service organizations.

The HCI storage 103b stores HCI actions performed by customer service representatives and customers when interacting with each other. HCI actions can include any kind of action that a human (or a bot) performs to instruct a computer system to perform a task or to receive information from a computer system. Actions include mouse input, keyboard input, reading information displayed on a computer display, augmented reality/virtual reality (AR/VR) actions, and so on. In some implementations, HCI actions are acquired by observing a user's (customer service representatives or customers) interactions by a HCI recorder installed on their computer. For example, a HCI recorder can record interactions of a customer service representative with a web page by monitoring the customer service representative's interaction with a document object model (DOM)

using JavaScript or similar technologies. The HCl recorder can detect when the customer service representative's mouse hovers over elements of a web page as he/she interacts with the web page. In addition, the HCl recorder can detect when the customer service representative enters values into input fields and/or clicks on buttons on the web page. In this way, the entire behavior of the customer service representative interacting with a web page can be recorded as an HCl action and stored in HCl storage 103b. Additionally, or alternatively, HCl actions can be acquired in relation to any computer program, whether it be a web-based program or a native application through other methods. For example, a HCl recorder can intercept keyboard inputs, graphics drawing instructions, mouse inputs, and so on to record the behavior of a user interacting with any kind of computer application. Similarly, a HCl recorder can take screenshots of a computer screen and detect the elements that a user is interacting with. Any method of monitoring a recording agent's interactions with any kind of computing system can produce HCl actions.

The policies storage 103c stores policies (or conditions, criteria, etc.) of an organization that can be used to align transcripts and HCl actions, cluster transcripts, label feature vectors, and train models. For example, it may be a particular company's corporate policy to require certain information to authenticate users prior to some transactions (e.g., a bank may require detailed identification information to authenticate a caller). The agent behavior/ratings storage 103d stores information about the customer service agents. For example, the agent behavior/ratings storage 103d stores results of evaluating individual instances of recorded agent behavior against a set of evaluation criteria such as but not limited to duration, customer satisfaction, compliance with policy, or any other such evaluation criteria. The vectors and labels storage 103e stores vector representations of transcripts, vector representations of HCl actions, feature vectors generated for transcripts, and labels of the feature vectors. The recommended response storage 103f stores recommended responses generated by the smart communications agent system in response to received queries. The RPA tasks storage 103g stores RPS tasks corresponding to the HCl actions generated in response to the received queries. These RPA tasks can be added to a RPA tasks queue 103h for execution by a computing system. The model storage 103i stores trained and untrained models as well as their corresponding scores that can be used to rank models (for example, in an order of increasing reliability of generating an optimum response, in an order of decreasing execution time to generate a recommended response, and so on). The metadata storage 103j stores metadata associated with received transcripts and HCl actions. For example, the metadata can include account number, time of day, time zone, agent name who answers the question, a mapping to a unique customer ID used internally by the bank's computer systems, and so on. The topic clusters storage 103k stores topic clusters that are generated by analyzing and processing the received transcripts and HCl actions. For example, the topic clusters storage 103k stores a cluster relating to a customer service conversation involving resetting a user's password.

The computing systems on which the smart communications agent system can be implemented include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices can include keyboards, pointing devices, touch screens, gesture recognition devices (e.g., for air gestures), head and eye tracking devices, microphones for voice recognition, and so on. The computing systems can include servers of a data center, massively parallel systems, and so on. The computing systems can access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media can have recorded on them or can be encoded with computer-executable instructions or logic that implements the recommendation system. The data transmission media are used for transmitting data via transitory, propagating signals or carrier waves (e.g., electromagnetism) via a wired or wireless connection. The computing systems can include a secure cryptoprocessor as part of a central processing unit for generating and securely storing keys and for encrypting and decrypting deployment data using the keys.

The smart communications agent system can be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the smart communications agent system can be implemented in hardware using, for example, an application-specific integrated circuit (ASIC).

Figure 1B:
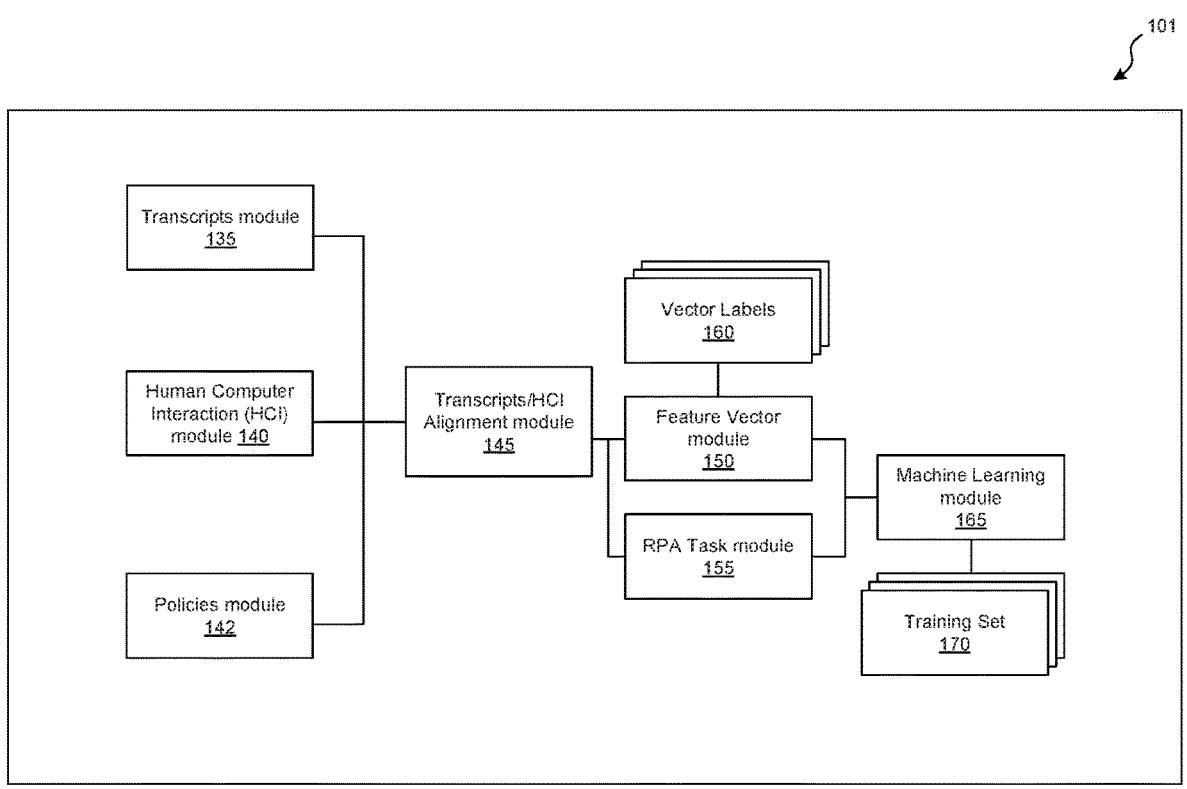
FIG. 1B is a block diagram illustrating components of a training models component in some implementations.

FIG. 1B is a block diagram illustrating components of a training models component 101 in some implementations. The training models component 101 can include a transcripts module 135, a HCl module 140, a policies module 142, a transcripts/HCl alignment module 145, a feature vector module 150, a RPA task module 155, and a machine learning module 165. The transcripts module 135 accesses transcripts (from the transcripts storage 103a) and computes vector representations of transcripts by mapping words or phrases of received transcripts to a set of vectors of real numbers.

For example, the transcripts module 135 maps a transcription of a phone conversation to produce a set of vectors that follows the phone conversation. For example, the transcripts module 135 identifies query-response pair for the transcription and then computes corresponding vector representations using a term frequency—inverse document frequency transformation (tf—idf transformation) of word/phrase counts or via a deep learning approach where long term short memory (LSTM) cells encode query/response pairs. During training, the transcripts module 135 can perform a hyperparameter search for both methods of vectorization and choose the best vectorization approach depending on which optimizes training in later steps. The vectors themselves can be 1-dimensional in nature and have a shape of (1,n) where n is the optimal feature size (for example, as determined by a grid search). Hyperparameter optimization finds a tuple of hyperparameters (constraints, weights or learning rates required by different machine learning models to generalize different data patterns) that yields an optimal model which minimizes a predefined loss function on given independent data. The objective function takes a tuple of hyperparameters and returns the associated loss. Cross-validation can be used to estimate this generalization performance.

In several embodiments, the transcripts module 135 tags the transcripts and/or the mapped vectors based on, for example, metadata associated with the transcript (stored in the metadata storage 103*j*), policies (stored in the policies storage 103*c*), communication medium/source via which the transcript was received (for example, chat, phone, email, web page, mobile application, smart device, IoT device, social media, etc.), and so on. The transcripts module 135 can store the vector representations of the transcripts and their tags in the transcripts storage 103*a*.

The HCl module 140 accesses HCl actions (from the HCl storage 103*b*) and computes vector representations of HCl actions by mapping received HCl actions to a set of vectors of real numbers. In several embodiments, the HCl module 140 tags the HCl actions and/or the mapped HCl vectors based on, for example, associated transcripts, policies, communication medium/source via which the HCl action was received, type of HCl action, and so on. The HCl module 140 can store the vector representations of the HCl actions and their tags in the HCl storage 103*b*. The policies module 142 accesses policies (from the policies storage 103*c*), which can then be used by the transcripts/HCl alignment module 145 to align transcripts and HCl actions.

The transcripts/HCl alignment module 145 align the vector representations of the received transcripts and HCl actions in time. For example, the vector representations of HCl actions corresponding to a customer support agent filling out a form may follow a set of vector representations of transcripts corresponding to a discussion where the agent asks a customer for information to fill in the form. In this way, the interactions between a conversation and what the agent does during the conversation may be observed. These two sources of information can be collectively referred to as a behavior stream, including the conversational output of an agent as well as their interactions with other systems during the conversation. The transcripts/HCl alignment module 145 aligns these components of the behavior stream in time. The transcripts/HCl alignment module 145 can store the aligned vector representations of the received transcripts and the HCl actions in the transcripts storage 103*a* and/or the HCl storage 103*b*.

The feature vector module 150 analyzes the aligned behavior stream to detect and analyze patterns of behavior. The patterns of behavior are then used to identify and label query-response pairs as well as to identify RPA tasks corresponding to the HCl actions. The feature vector module 150 can cluster the transcripts/HCl actions so that communications (e.g., chats) directed to similar topics are in the same clusters. The feature vector module 150 can store the clusters in topic clusters storage 103*k*. In several embodiments, the feature vector module 150 analyzes the behavior stream to detect patterns of behavior. The patterns of behavior may be patterns over time of a single agent, patterns of many agents contemporaneously, or a combination thereof. For example, the behavior stream may represent dozens of agents all responding to similar topics over a long period of time. This type of dataset provides a wide breadth and depth of examples of similar behavior among different agents and over time as well. The feature vector module 150 identifies all of these examples of common behaviors both over time and between different agents. For example, one cluster identified by the feature vector module 150 may be a customer service conversation involving resetting a user's password. The feature vector module 150 identifies all instances of all of the monitored agent's behavior that fits the pattern of asking similar questions and performing similar tasks to reset a customer's password. In several embodiments, the feature vector can comprise a work rating score applied based on the agent who was involved with the communication and the agent's behavior evaluated against a set of evaluation criteria such as duration, customer satisfaction, compliance with policy, and so on (e.g., responses for good agents can get higher scores). For example, one set of criteria may optimize for economy by selecting behaviors which result in the quickest conversations, while another may optimize for outcome by selecting behaviors which produce the most satisfaction for customers. These criteria may be evaluated automatically or by manual review. For example, based on the agent (and his/her behavior), a highly regarded agent may have a 100-score included in each feature vector for that agent, whereas a poorly regarded agent may have a very low value score label included in each feature vector for that agent.

The feature vector module 150 then generates a feature vector for each communication. For example, the feature vector may have a term frequency-inverse document frequency features, metadata features such as length of questions, punctuations, and so forth. The feature vector module 150 can store the feature vectors in the vectors and labels storage 103*e*. Once the feature vectors are generated, the feature vector module 150 can apply a dimension reduction (for example, using singular valued decomposition or principal component analysis).

The feature vector module 150 can automatically label the feature vectors (vector labels 160). For example, the feature vector module 150 can label feature vectors based on the response of that query/response pair and any computer interactions correlated to that query/response pair. The feature vectors can also be labeled with things such as what is the next thing the agent stated and another label can be what is the human computer interface and her action that the agent performed.

In several embodiments, the feature vector module 150 can label feature vectors based on an automatability score that is proportional to how much HCl agents have to perform to accomplish the HCl action. As an example, this kind of metric may reveal that password resets are comparatively easy to perform by agents, but a change of address requires many repetitive steps. A feature vector corresponding to this kind of task may then be assigned a high automatability score label to reflect that the call center could achieve greater efficiency by automating those tasks. The feature vector module 150 can store the feature vector labels in the vectors and labels storage 103*e*.

The RPA task module 155 generates RPA tasks corresponding to HCl actions associated with each communication. For example, for a customer service conversation involving resetting a user's password, the RPA task module 155 can generate a task for accessing the user's current password, a task for receiving a new password from the user, and a task for updating the user's password to be the new password received from the user. The RPA task module 155 can store the generated tasks in the RPA tasks storage 103*g*.

The machine learning module 165 uses the feature vectors and vector labels generated by the feature vector module 150 and the RPA tasks generated by the RPA tasks module 155 to train machine learning models (trained models 170). In several embodiments, policies (for example, stored in the policies storage 103*c* (FIG. 1A) are also used to train the machine learning models 170. For example, corporate policies stored in the policies storage 103*c* can be used to train machine learning models to ensure compliance with the policy regardless of captured agent behavior. If a training set includes behavior segments which include non-compliant behavior, a machine learning model may learn such non-compliant behavior for some inputs. Rather than allow the machine learning model to stray from such corporate policies, the policy can be included in the training set to ensure compliance. During training, behaviors divergent from the policy can be omitted from the learning process.

The machine learning module 165 can use various machine learning techniques, such as a support vector machine, a Bayesian network, learning regression, and a neural network, when generating the trained models 170. For example, the machine learning module 165 can employ a support vector machine to train classifiers for each cluster that implements the model. To train a classifier for a certain target feature value (e.g., certain query/response pairs), the machine learning module 165 can use the feature vectors of the transcripts that have that target feature value as positive examples of training data and the feature vectors of the transcripts that do not have that target feature value as negative examples of training data.

A support vector machine operates by finding a hypersurface in the space of possible inputs. The hypersurface attempts to split the positive examples (e.g., filter of company X) from the negative examples (e.g., filter of company Y) by maximizing the distance between the nearest of the positive and negative examples and the hypersurface. A support vector machine simultaneously minimizes an empirical classification error and maximizes a geometric margin. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Platt, J., "Sequential Minimal Optimization," 1998 http://research.microsoft.com/pubs/69644/tr-98-14.pdf.)

A support vector machine is provided training data represented by $(x_i, y_i)$ where $x_i$ represents a feature vector and $y_i$ represents a label for page i. A support vector machine may be used to optimize the following:

$$\min_{w,b,t} \frac{1}{2} w^T w + C \sum_{i=1}^{l} \xi_i$$

such that $y_i(w^T \phi(x_i) + b) \geq 1 - \xi_i$, $\xi_i \geq 0$ where vector w is perpendicular to the separating hypersurface, the offset variable b is used to increase the margin, the slack variable $\varepsilon_i$ represents the degree of misclassification of $x_i$, the function $\varphi$ maps the vector $x_i$ into a higher dimensional space, and C represents a penalty parameter of the error term. A support vector machine supports linear classification but can be adapted to perform nonlinear classification by modifying the kernel function as represented by the following:

$$(K(x_i, x_j) = \phi(x_i)^T \phi(x_j))$$

In some implementations, the machine learning module 165 uses a radial basis function ("RBF") kernel as represented by the following:

$$K(x_i, x_j) = \exp(-y \|x_i - x_j\|^2), y > 0$$

The machine learning module 165 can also use a polynomial Gaussian RBF or a sigmoid kernel. The machine learning module 165 can use cross-validation and grid search to find optimal values for parameters y and C. (See Hsu, C. W., Chang, C. C., and Lin, C. J., "A Practical Guide to Support Vector Classification," Technical Report, Dept. of Computer Science and Information Engineering, National Taiwan University, Taipei, 2010.)

The machine learning module 165 can then rank the trained models based on their accuracy, average time to provide an answer, and so forth. For example, these rankings can be determined based on using the feature vectors to identify what label the model will generate for those feature vectors. The machine learning module 165 can store the trained models 170 and their rankings in the model storage 103i (FIG. 1).

Figure 2:
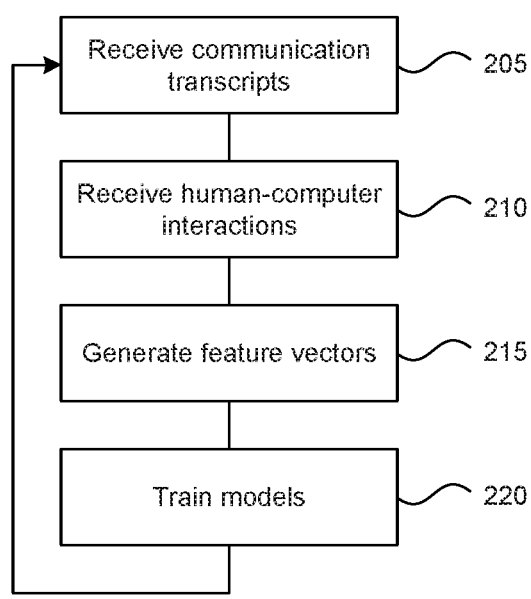
FIGS. 2-3 are flow diagrams that illustrate processing of a training models component in some implementations.

FIG. 2 is a flow diagram that illustrates processing of a training models component to learn customer support agent behaviors in some implementations. In blocks 205-220, the training models component loops collecting the transcripts and HCl actions to train machine learning models. In block 205, the component receives communication transcripts. In block 210, the component receives associated HCl actions. In block 215, the component generates feature vectors corresponding to the received transcripts and HCl actions. In block 220, the component trains machine learning models using the generated feature vectors.

Figure 3:
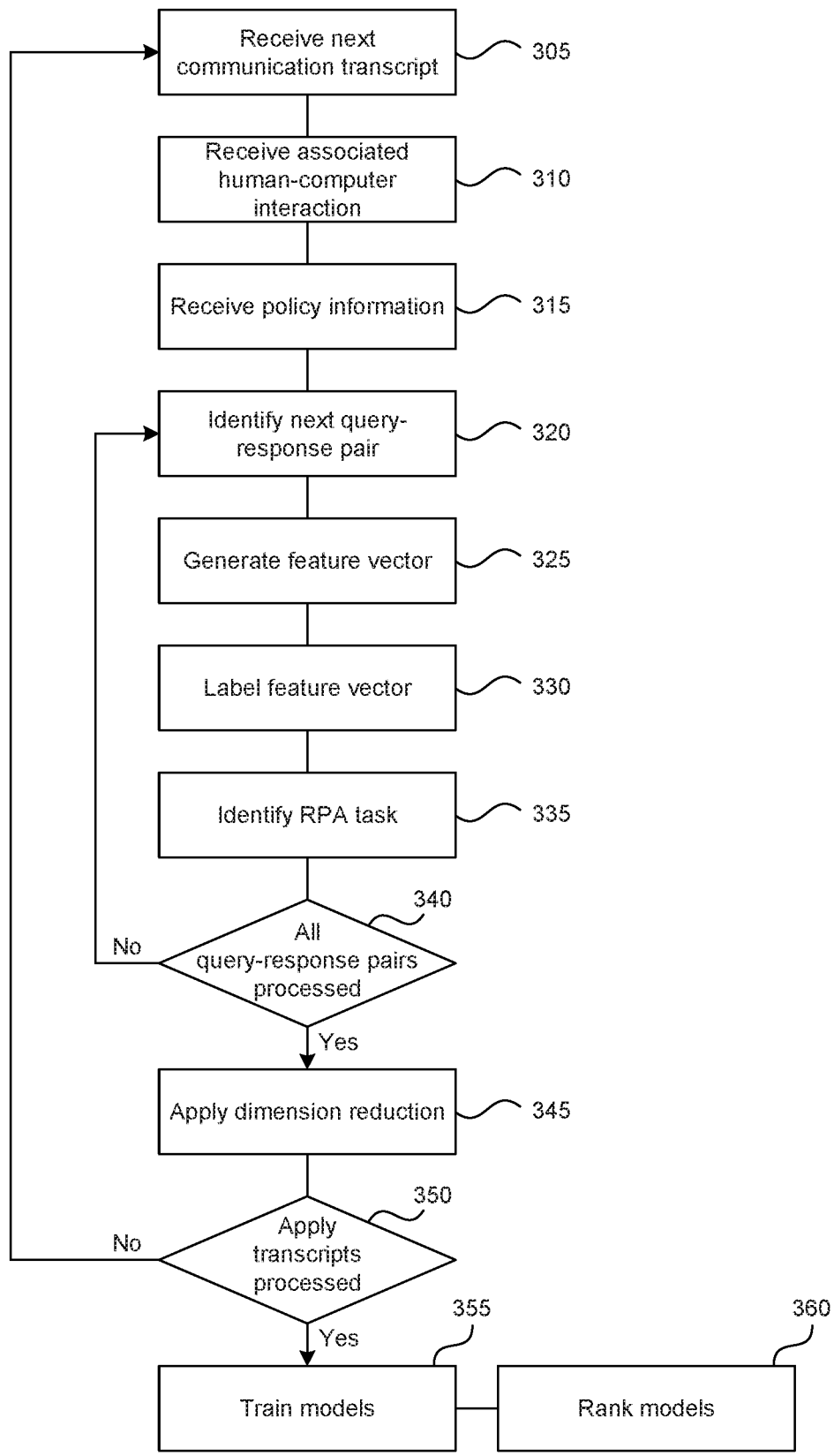

FIG. 3 is a flow diagram that illustrates processing of a training models component in some implementations. In blocks 305-350, the component loops collecting and processing the transcripts and HCl action data received by the component. In block 305, the component receives transcripts and associated metadata. The transcript can comprise query-response pairs. Table 1 (see FIG. 9A) illustrates an example transcript.

TABLE 1

Agent [09:34]: Hello my name is Jane. How can I help you?
　Customer [09:35]: Hi Jane. Sorry I'm late, I'm looking to pay my bill.
Agent [09:37]: I can help you with that. May I ask you a few verification questions so I can open your account and help you with that?
　Customer [09:37]: Sure
Agent [09:39]: What is your account number?
　Customer [09:40]: I don't have that, is there another way you can pull me up?
Agent [09:41]: Yes. Can I get your name and the last four digits of your social?
　Customer [09:41]: Yes. My name is John Doe and the last four of my social are 1234.
Agent [09:43]: Thank you. One moment while I pull that up.
Agent [09:44]: For verification purposes can you tell me your address?
　Customer [09:45]: 123 Awesome St., San Francisco, CA 94108.
Agent [09:48]: Thank you John. I see you are past due $132.56 for June. That includes the late fee. Are you looking to pay that full amount?
　Customer [09:48]: Yes.
Agent [09:50]: Would you also like to pay July's payment now in the amount of $102.56?
　Customer [09:52]: No, I can only pay June's payment right now.
Agent [09:55]: Ok. I see you have a payment method saved on your account. Would you like to use that account or another?

Also, in block 305, the component can generate vector representations of the transcript. For example, as discussed above, transcripts module 135 of a training models component 101 identifies query-response pair for a transcript and then computes corresponding vector representations. In several embodiments, the component can first filter the transcripts to remove redundant/superfluous words/phrases. For example, the component can filter out greeting phrases (e.g., Hello, How are you?, How can I help you?, and so on), goodbye phrases (Thank you, good luck, and so on), and other commonly used phrases. For example, the components can identify these redundant/superfluous words/phrases based on the context of the transcripts, the communication medium, policies, and so on.

In block 310, the component can receive HCl action associated with the transcript. Table 2 (See FIG. 9A) illustrates example HCl actions received for the transcript illustrated in Table 1.

TABLE 2

[09:34]: Chat window opens for agent.
[09:34]: Agent types greeting in chat window.
[09:37]: Agent types response in chat window.
[09:39]: Agent types question in chat window.
[09:41]: Agent types question in chat window.
[09:43]: Agent opens CRM and inputs customer information. Customer account is pulled up in system.
[09:44]: Agent types verification question in the chat window.
[09:46]: Agent reviews customer address in CRM and confirms it matches what customer put in the chat window.
[09:47]: Agent navigates to billing information on customer's account in the CRM. Agent verifies how many days the customer is past due. Confirms it is less than 30 days.
[09:48]: Agent types response in chat window.
[09:49]: Agent reviews current/upcoming payment in CRM.
[09:50]: Agent types question in chat window.
[09:53]: Agent checks if customer has a payment method saved in CRM.
[09:55]: Agent types response/question in chat window.

Also, in block 310, the component can generate vector representations of the HCl actions. In block 315, the component receives policy information (for example, policies for responding to customer queries by a bank customer service agent). Table 3 (see FIG. 9B) illustrates an example policy of an organization.

TABLE 3

Past Due Policy:
  If account is less than 90 days late agent can take payment.
  If account is over 90 days late transfer to collections department.
  Policy guidelines around waiving late fees.
Verification Requirements Policy:
  Provides requirements based on what the customer is trying to do what verification requirements are.
    Ex. Making Payment
      Account # & Name
      Last 4 of SSN & Name & Address
    Ex. Change Subscription Plan
      Account # & Name PLUS Last 4 of SSN OR Address Once the training data (transcripts, HCl actions, and policies) is collected, the component clusters the transcripts so that transcripts directed to similar topics are in the same clusters. For example, the component can cluster transcripts related to password reset queries in one cluster and transcripts related to setting-up travel alerts in another cluster. In several implementations, the component can classify a transcript in multiple clusters depending on the contents of the transcript. For example, when a transcript includes queries for both password reset and check account balance, the component can classify that transcript to both the password reset cluster and the check account balance cluster. Alternatively, or additionally, the component can split up a transcript into two or more components and assign each component to different clusters. In blocks 320-340, the component loops generating feature vectors for transcripts. In block 320, the component identifies query-response sets in each transcript. The query-response sets can be associated with HCl actions. For example, in a transcript relating to password reset questions, a query-response set comprises the following query-response pairs and HCl actions: (1) Query-what is your username, Response—my username is ABC, HCl Actions-verify if ABC is a valid username; if valid, retrieve security questions A1 and A2; and (2) Query-Please answer security questions A1 and A2, Response-receive answers to security questions A1 and A2, HCl Actions-validate answers to security questions A1 and A2. Table 4 (see FIG. 9B) illustrates example query-response sets identified for the transcript illustrated in Table 1.

TABLE 4

Kylie: Hello this is Kylie. How can I help you?
  Customer: I'm looking to pay my bill/I need to pay my bill/I want to make a payment
Kylie: Ok. I can help you_____. May I ask you a few ons so verification questi I can open your account and help you with that?
  Customer: Sure/Yes
Kylie: What is your account number?
  Customer: I don't have that, is there another way you can pull me up?
Kylie: Yes. Can I get _____.
  Customer: Yes. My name is John Doe and the last four of my social are 1234.
Kylie: For verification purposes can you tell me _____?
  Customer: 123 Awesome St., San Francisco, CA 94108.
Kylie: Thank you {CustomerName}. I see your current balance is ${AccountBalance}. Are you looking to pay this amount in full?
  Customer: Yes.
Kylie: Would you also like to make your upcoming payment of ${NextInvoiceAmt}?
  Customer: No.
Kylie: Ok. Would you like to use the payment method you have saved?

Figure 4:
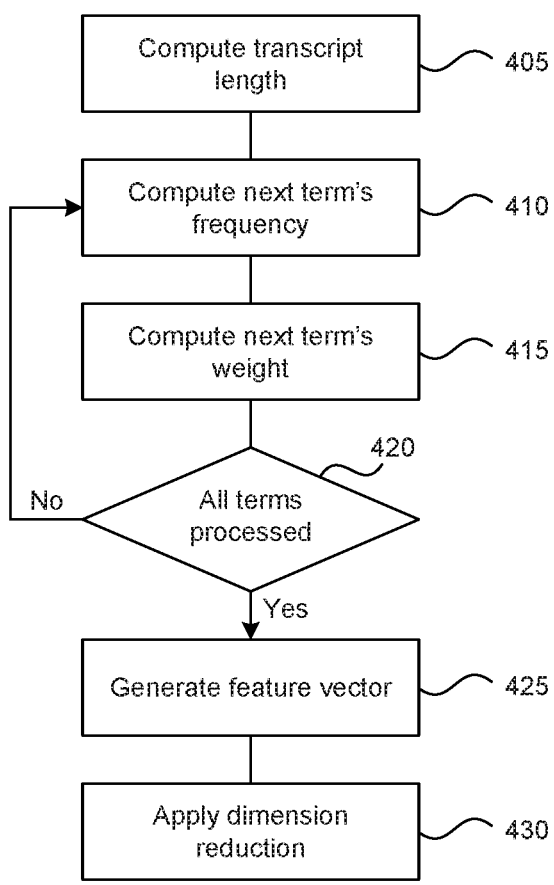
FIG. 4 is a flow diagram that illustrates processing of a feature vectors component in some implementations.

In block 325, the component can generate feature vectors for each query-response set (or each transcript). The component can use various statistical methods, such as term frequency—inverse document frequency (tf-IDF), term frequency-proportional document frequency (tf-PDF), and so on to compute the feature vectors. FIG. 4 is a flow diagram that illustrates processing of a feature vectors component of a training models component in some implementations. In block 405, the feature vectors component computes a length of text in the query-response set. In block 410, the component computes a frequency of each term (or phrase) in the query-response set. In block 425, the component computes a weight for the term using its frequency and the length of text in the transcript. The component loops through all terms in the transcript to generate a feature vector for the transcript (in block 425). For example, the feature vectors can have term frequency-inverse document frequency features, metadata features such as length of questions, punctuations, and so forth.

In block 430, the component can apply dimension reduction on the generated feature vector. For example, the component can apply techniques such as regression, classification, principal component analysis (PCA), kernel PCA, graph-based kernel PCA, non-negative matrix factorization (NMF), linear discriminant analysis (LDA), generalized discriminant analysis (GDA), and so on to reduce the dimensions of the generated feature vector.

Returning to FIG. 3, after generating the feature vector for a query-response set (in block 325), the component generates labels for the feature vector in block 330. Labels can be generated using metadata of the transcript, policies, agent behavior information, reliability scores, and so on. For example, the component can label feature vectors as positive or negative examples or have a work rating score applied based on the agent who was involved with the chat. For example, a highly regarded agent can have a 100-score included in each feature vector for that agent, whereas a poorly regarded agent can have a very low value score included in each feature vector for that agent. The feature vectors can be labeled with things such as what is the next thing the agent stated and another label can be what is the HCl action that the agent performed.

The component can generate labels for vectorized query/response pairs in order to create a map between the state of the conversation and the action that the smart communications agent system can take. Actions can come in the form of: responding in the conversation, performing an action with API/RPA, ending the conversation, and/or any other action needed to be performed by the smart communications agent system.

Each vectorized query/response pair can be given a multi-label annotation associated to which of the actions is desired given the current state of the conversation. For example, if a certain query/response pair should lead to the creation of a RPA task labelled 17 then a training point might look like:

[0.267334, −0.234,−.67523, 0.45234345, . . . ]−>[0, 0, 1, 0, 0, . . . ]

In the above example, the first vector represents the featurized version of the query-response pair and the "1" in the second vector represents the fact that RPA task 17 is to be performed.

Another example may look like:

[0.267334, −0.234, −0.67523, 0.45234345, . . . ]−> [0, 0, 1, 0, 1, . . . ]

In the above example, the vector on the left is the same representation of an incoming query and the output label now has a "1" for RPA Task 17 as well as another "1" that represents the fact that the smart communications agent system can respond to the conversation with a certain type of response.

In block 335, the component identifies RPA tasks corresponding to the HCl actions associated with the feature vectors. For example, for the HCl action to verify if ABC is a valid username, a corresponding RPA task can be executing a query script that accesses a data storage location and checks if ABC is included as a valid username.

The RPA tasks/scripts can be simplified instruction sets made to replicate discrete actions taken by an agent during the course of a customer-agent interaction. The RPA tasks are generated by following the NCI's obtained from the agent and matching timestamps against the conversation to see the discrete steps taken in order to obtain information. This task can then be checked against an auditor (e.g., a human auditor, an automated auditor, etc.) to create the final task representation. A graphical structure can be used to represent the discrete actions that the RPA task represents. In some embodiments, the RPA tasks are represented in a JSON format, as illustrated in Table 5 below.

TABLE 5

```
{
    // Designated by the user (description is optional)
    "procedureName": "Issue refund for late delivery",
    "procedureDescription": "",
    "originalAuthor": "ABC",
    "dateCreated": "2018-05-03 22:00:00",
    "mostRecentEditor": "XYZ",
    "dateUpdated": "2018-05-04 10:00:00",
```

TABLE 5-continued

```
    "draft": false,
    "loopProcedure": false,
    "version": "2",
    // Generated by the user's interactions with the GUI
    "instructions": {
        "firstTask": "1",
        "1": { // By default, if a user does not specify a task name, use
the task type concatenate a number
            "taskType": "goToWebsite",
            "taskName": "Go to CRM",
            "nextTask": {
                "default": "2",
            },
            "inputVariable": {
                "value": "https://www.CRM.com/cases", ...
            },
        },
        "2": {
            "taskType": "getText",
            "taskName": "Get order price",
... ...
```

The component repeats blocks 320 to 340 for each query-response set in a transcript. After all relevant query-response sets are processed, the component can generate feature vectors for the entire transcript, for example, by combining the labeled feature vectors for the query-response sets in the transcript (in blocks 320-340). Alternatively, or additionally, the component can perform blocks 320-340 only one for the entire transcript. In block 345, the component can perform further dimension reduction (similar to that discussed in block 430). In several embodiments, the component can further evaluate the feature vectors of a transcript against a set of criteria for those vectors of activity that represent best practices of customer service agents and present the most benefit in automating.

After the component determines in block 350 that all (or a threshold number of) transcripts are processed, in block 355 the component trains machine learning models using the generated feature vectors, associated labels, RPA tasks, policies, and so on. The machine learning models can be based on linear regression, Bayesian inference, support vector machine, neural network, and so on. In block 360, the component can rank the trained models based on their accuracy, average time to provide an answer, and so on. For example, the component can train the models using 90% of the training data and hold back 10% of the training data for evaluation purposes. After training the models on 90% of the data, the component can test the trained model using the held-out 10% of data against various metrics (for example, metrics to test the accuracy, average time to provide an answer, and so on). The metric values can then be used to rank the models. The component can maintain different rankings of the models for the different metric/criteria used.

Figure 5:
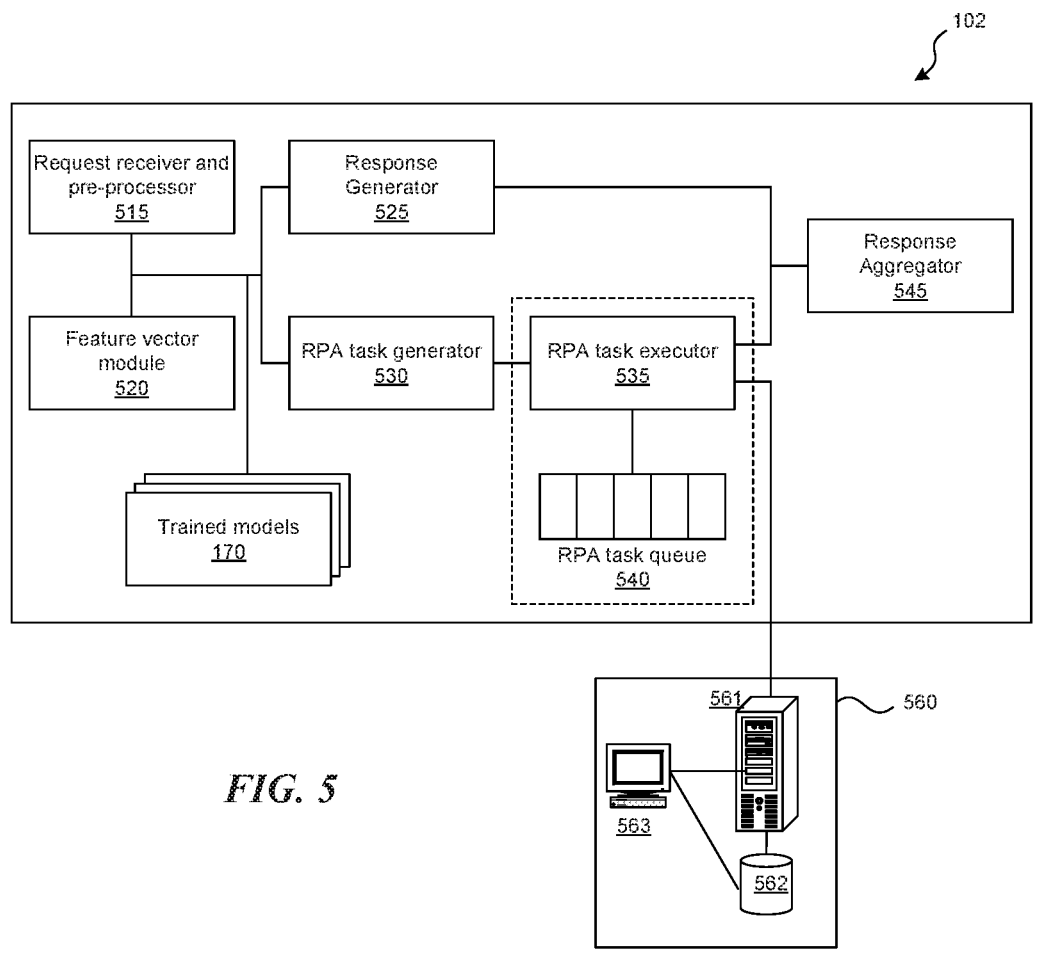
FIG. 5 is a block diagram illustrating components of a robotic process automation component in some implementations.

FIG. 5 is a block diagram illustrating components of a robotic process automation component 102 in some implementations to provide automated responses to queries using the trained models. The robotic process automation component 102 can include a request receiver and pre-processing module 515, feature vector module 520, response generator 525, RPA task generator 530, RPA task executor 535, and response aggregator 545. The sub-components of the robotic process automation component 102 can be co-located or distributed across computing systems (for example, in a cloud computing environment). The request receiver and pre-processing module 515 receives a request/query from a user (for example, a bank customer). The query can be received in any form such as audio recordings, emails, SMS text messages, short-form text messages of any other kind, social media interactions such as TWITTER® interactions, or any other communications in any format or structure. The request receiver and pre-processing module 515 can process the request to, for example, remove superfluous/redundant words/phrases, identify metadata, identify the communication medium via which the request is received, and so on. The metadata may include account number, time of day, time zone, a mapping to a unique customer identifier used internally by the bank's computer systems, and so on.

As users interact with the smart communications agent system, the system can take query/response pairs from the conversation and vectorize them in accordance to the vectorization method learned during training. This vectorization (possibly including dimension reduction) is fed into the model to obtain a prediction of the labels needed to be acted on. In some embodiments, before doing so, any policy that matches the situation is checked and takes precedence over a model-directed action. If a policy matches the current situation, then that action is taken and fed into the model as input for what to do next.

The feature vector module 520 generates feature vectors for the received request based on, for example, the contents of the request (words/phrases), the communication medium via which the request was received, policies, communication stream/history (for example, the last communication in a chat provided by the customer), and so on.

The response generator 525 then uses one or more trained models 170 (for example, generated by the training models component 101) to generate a recommended response to the request. The response generator 525 can select a model based on one or more of the following factors: communication medium, goal/criteria, chat topic, customer priority, and so on. For example, the response generator 525 can access the trained models, and based on an identified goal (for example, minimize time to respond), choose a model from a ranked list of models. Alternatively, or additionally, the response generator 525 selects a model based on the communication medium. For example, the response generator 525 may select a first trained model for password reset requests received via a phone call, while it may select a second model for password reset requests received via a chat interface. Similarly, the response generator 525 may select a third model for password reset requests received via an email and a fourth model for change of address requests received via an email, and so on. In some implementations, there may not be a trained model for the features of a received request (for example, a request for a particular topic received via a particular communication medium). In these cases, the response generator 525 can select a best-fit model or a human agent to respond to the request.

In some implementations, the response generator can select a model based on an initial portion of the request, such as an initial segment of a phone call or a first text message. If, during the course of the request stream, the topic shifts or the selected model is unable to respond, the response generator can select another model to handle the request or escalate the request to a live agent or operator. In some implementations, this switch of agent model may be transparent to the customer, such that they are unaware the underlying model has changed. For example, if during a phone call which started out as a request for a password reset, the customer starts asking questions about a change of address topic that the password reset model is unable to answer, the response generator 525 can select a second model which handles change of address requests. Certain feature of the response (for example, a synthesized voice that is communicating with the customer) may remain constant throughout the call such that the customer on the other end is unaware that the change has happened, beyond receiving appropriate responses to the new line of inquiry.

Similar to the response generator 525, the RPA task generator 530 selects and uses one or more trained models 170 (for example, the model selected by the response generator 525) to generate RPA tasks to be performed in response to the received request. The RPA task generator 530 can reproduce any HCl action that was captured during model training discussed earlier. For example, the RPA task generator 530 can generate RPA tasks corresponding to mouse and keyboard inputs to computer terminals as well as tasks related to reading data displayed on a computer terminal so that the results can be relayed back to response aggregator 545.

The RPA task generator 530 then communicates with the RPA task executor 535 to executes the generated RPA tasks. In several embodiments, the RPA task generator or the RPA task executor 535 add the generated RPA tasks to one or more RPA task queues 540. Alternatively, or additionally, customer service representatives can also generate and add RPA tasks to the RPA task queues 540. The RPA task executor 535 can comprise robotic process agents (for example, similar to macros) that can perform computer interactions that an agent would have otherwise performed to respond to the received request.

During execution, the response generator 525 and/or the RPA task executor 535 may need to interact with external systems to satisfy the received request. For example, the RPA task executor 535 may need to look up customer information in a third-party database to validate an address that the customer has provided or to retrieve order information about an order the customer placed. Similarly, the RPA task executor 535 may need to transmit information via an external computing system, such as sending an authentication code via a second communication medium for two-factor authentication purposes.

In some implementations, the necessary systems may not be directly accessible by the RPA task executor 535. For example, the RPA task executor 535 may reside in a data-center remote from call center premise 560. There may exist a computing resource that is only directly accessible on call center premise 560 such as a database server 562 in the call center which resides behind a corporate firewall. Rather than requiring custom software development to make the database accessible, the RPA task executor 535 can instead communicate with a robotic process automation agent (for example, at server 561) that resides at the call center premise 560 and has access to resource 562 such as a database.

In some cases, however, even such a direct route as this may be insufficient if the database or other resource 562 is not accessible by customer service agents at call center premise 560. In these cases, robotic process automation agent at server 561 can reproduce human-computer interactions (HCl) with a computer terminal 563 at the call center premises 560 that does have access to resource 562. In this way, the smart communications agent system 100 can fully and transparently replace human customer service agents at call center premise 560 while not requiring the smart communications agent system 100 to be installed at call center premise 560.

The response aggregator 545 generates a combined response based on the response(s) generated by the response generator 525 and the results of executing the RPA tasks by the RPA task executor 535. For example, for a travel notice request, the response aggregator 545 can generate a combined response that informs the user that a travel notice will be in effect for up to a certain date, where the date is retrieved via the RPA tasks executor 535 and provided as the response in the chat.

In several embodiments, various components of the smart communications agent system 100 can log/record the various steps/actions, which can then be used for reporting/analysis purposes. For example, dashboards can be utilized for quality assurance and auditing purposes to give managers of a customer service organization real-time insight into their operations.

Figure 6:
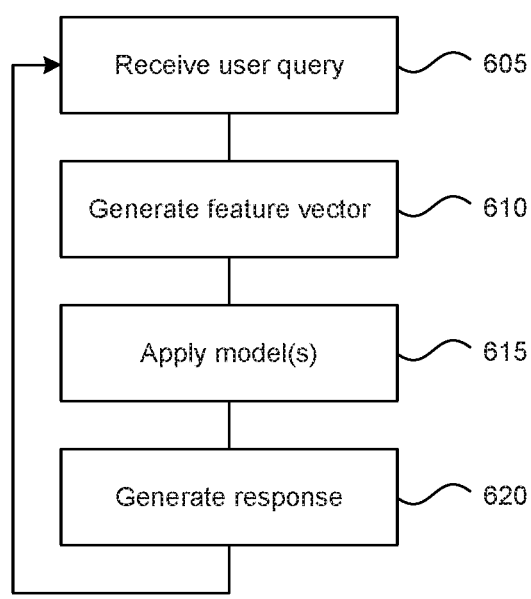
FIGS. 6-8 are flow diagrams that illustrate processing of a robotic process automation component in some implementations.

FIG. 6 is a flow diagram that illustrates processing of a robotic process automation component 102 in some implementations. In blocks 605-620, the robotic process automation component 102 loops receiving user queries and generating responses. In block 605, the component receives a user query. In block 610, the component generates a feature vector corresponding to the query based on, for example, the contents of the request (words/phrases), the communication medium via which the request was received, policies, communication stream/history (for example, the last communication in a chat provided by the customer), and so on. In block 615, the component selects and applies models to the generated feature vector. In block 620, the component generates a response to the received user query.

Figure 7:
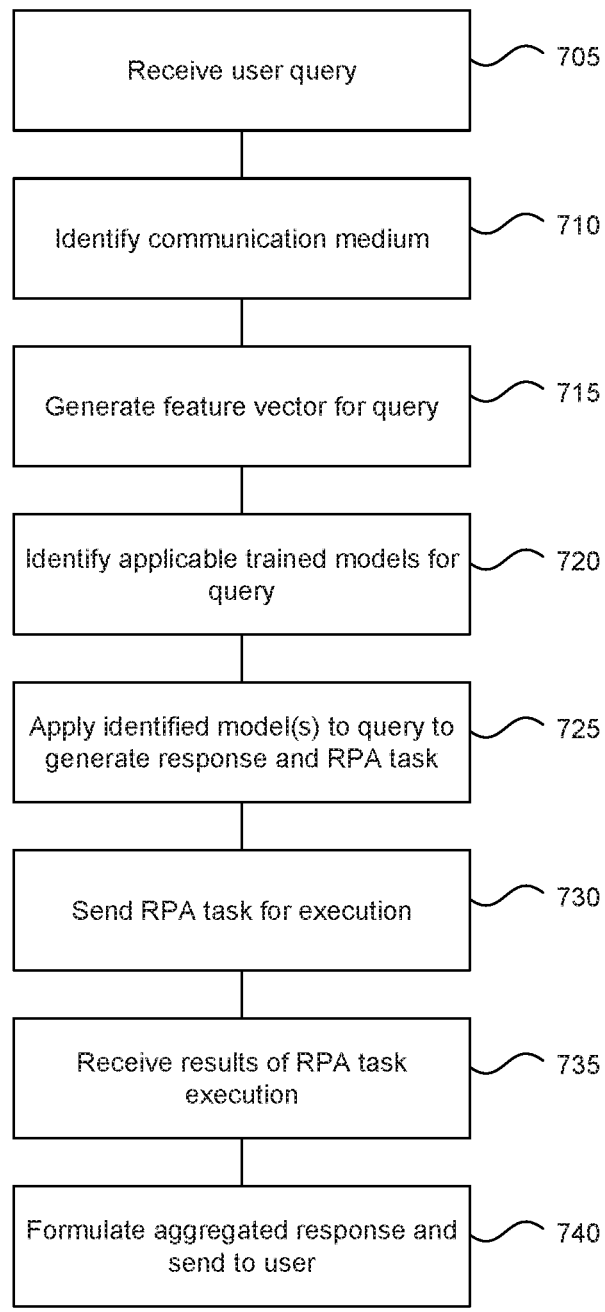

FIG. 7 is a flow diagram that illustrates processing of a robotic process automation component in some implementations. In block 705, the component receives a user query. Table 6 illustrates an example user query/request.

TABLE 6

Customer [12:55]: I'm looking to pay my bill.

In block 710, the component identifies the communication medium via which the query was received. The communication medium is then used by the component in block 715 to generate a feature vector corresponding to the query. Other factors can be used by the component to generate the feature vector: the contents of the query (words/phrases), policies, communication stream/history (for example, the last communication in a chat provided by the customer), and so on. Table 7 illustrates an example of vector representations of the query illustrated in Table 6.

TABLE 7

[.23, .654, −234, −.2334]

In block 720, the component identifies models that can be applied to the query to generate a response. The models can be identified based on the communication medium, contents of the query, related topic(s), customer who initiated the query, policies, and so on. The component can then select an optimum model using the model ranking based on, for example, a desired goal (e.g, quickest response, most comprehensive response, minimal privacy invasive response, and so on). In block 725, the component applies the identified model(s) to the received query and generates a response and/or associated RPA tasks.

In block 730, the component transmits the RPA tasks to, for example, a RPA task executor (component 535 in FIG. 5) for execution. In block 735, the component receives results of the RPA task execution, which are then combined with the response (generated in block 725) to generate an aggregated response that is transmitted to the user (in block 740).

Table 8 illustrates an example model output that is generated for the query illustrated in Table 6.

TABLE 8

Output: [0, 0, .89, 0, 0, .002]

The output illustrated in Table 8 informs the smart communications agent system with 89% confidence that the model thinks RPA Task 17 should be performed. In this example, RPA Task 17 is not sent off directly to a RPA task executor (component 535 in FIG. 5) for completion. For example, assume that after the RPA Task 17 comes back, the smart communications agent system identifies that the customer's account is over 90 days old (see policy illustrated in Table 3). That is, RPA Task 17 Results ={"account_age": 91, . . . }

These results are fed into model's policy section and then the model determines that the customer's request/query is to be transferred due to account age before vectorization of any new queries. That is, the smart communications agent system can respond with the following message: "I will need to transfer you due to the age of your account."

Figure 8:
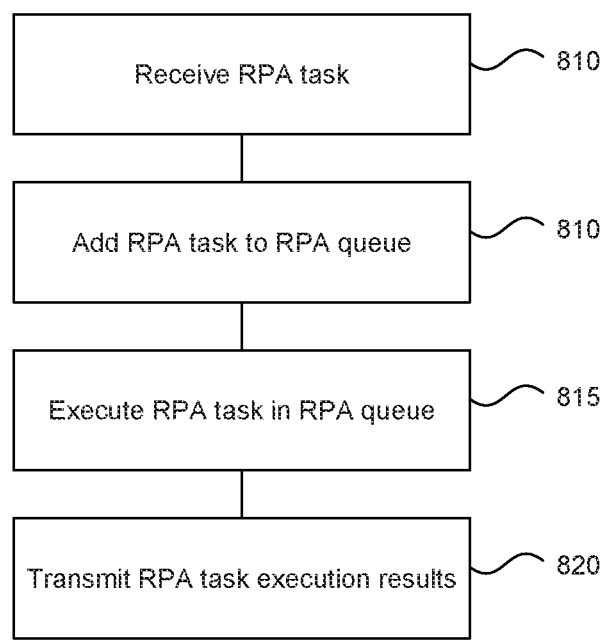

FIGS. 8 is a flow diagram that illustrates processing of a RPA task executor component in some implementations. In block 805, the component receives a RPA task for execution (for example, a RPA task 17). In block 810, the component adds the received RPA task to one or more RPA task queues. The RPA task queues can include RPA tasks generated automatically by the smart communications agent system 100 or generated manually by a human customer service representative. In block 815, the component can select a task from the RPA queue (for example, in a first-in-first-out FIFO order) for execution. After executing the RPA task, the component, in block 820, can transmit the execution results to, for example, the response aggregator (component 545 in FIG. 5).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

What is claimed is:

1. A method performed by a computing device for modeling agent behavior, the method comprising:
   accessing transcripts of communications between customers and agents, each communication comprising one or more query/response pairs of a query by a customer and a response by an agent, each transcript having a set of associated computer interactions performed by the agent based on the communication of the transcript and correlated to the query/response pairs;

generating topic clusters of the transcripts based on similarity of topics of the transcripts;
for each topic cluster of transcripts,
for each transcript in that topic cluster, for each query/response pair,
generating a feature vector for the query of that query/response pair;
labeling the feature vector based on the response of that query/response pair and any computer interactions correlated to that query/response pair; and
training a model for that topic cluster using the label feature vectors generated from the transcripts of that topic cluster,
wherein each trained model for a topic cluster identifies responses and computer interactions when provided a query associated with a communication relating to a topic that is similar to the topic of that topic cluster so that the identified responses can automatically be provided and the identified computer interactions can be translated to generate one or more robotic process automation (RPA) tasks that can be automatically performed.

2. The method of claim 1 further comprising: receiving a policy including a set of requirements corresponding to the transcript, wherein the model is further trained to comply with the policy.

3. The method of claim 1 further comprising: applying dimension reduction to the feature vector for the query.

4. The method of claim 1, wherein the transcripts are derived from communications over a first communications medium, and
wherein the model is configured to respond to communications over the first communications medium.

5. The method of claim 4, wherein the communications medium is one of telephonic communications, email communications, text chat communications, social media, smart device, or Internet of Things device communications.

6. The method of claim 1, wherein the computer interactions performed by the agent are received from a human-computer interaction recorder installed on a computer terminal used by the agent.

7. The method of claim 1, wherein the feature vector for the query is generated using term frequency-inverse document frequency (tf-IDF) or term frequency- proportional document frequency (tf-PDF).

8. The method of claim 1 further comprising: computing a ranking metric value for each trained model, wherein the trained models for each topic cluster are ranked according to the computed ranking metric value.

9. A method performed by a robotic process automation module at a computing device for providing recommendations of agent behavior, the method comprising:
receiving a query by a customer;
generating a feature vector for the received query;
identifying a trained model having been trained using transcripts of communications between customers and agents, wherein the trained model identifies responses and robotic process automation (RPA) tasks when provided one or more queries;
generating a response and a set of RPA tasks in response to the received query by applying the identified trained model to the generated feature vector for the received query;
executing, by one or more robotic process agents, at least one RPA task in the generated set of RPA tasks; and
sending the generated response to be provided to the customer.

10. The method of claim 9, further comprising adding the generated set of RPA tasks to a data structure of RPA tasks, wherein the data structure of RPA tasks is located at a second computing device that is communicatively coupled to the computing device.

11. The method of claim 9, wherein the generated set of RPA tasks includes at least one task generated by a customer service agent.

12. The method of claim 9, wherein the trained model has been further trained to comply with a policy, and
wherein the policy includes a set of requirements corresponding to an organization.

13. The method of claim 12, wherein the feature vector for the received query is generated based on the policy.

14. The method of claim 9, wherein at least one RPA task in the generated set of RPA tasks corresponds to a computer interaction that could be performed by an agent in response to the query.

15. The method of claim 9 further comprising:
identifying a communication medium via which the query is received,
wherein the trained model has been further trained to respond to queries received via the communication medium.

16. The method of claim 15, wherein the feature vector for the received query is generated based on the communication medium.

17. A method performed by a computing device for modeling agent behavior, the method comprising:
accessing transcripts of communications between customers and agents, each communication comprising one or more query/response pairs of a query by a customer and a response by an agent, each transcript having a set of associated computer interactions performed by the agent based on the communication of the transcript and correlated to the query/response pairs;
generating topic clusters of the transcripts based on similarity of topics of the transcripts;
for each topic cluster of transcripts,
for each transcript in that topic cluster, for each query/response pair,
generating a feature vector for the query of that query/response pair;
labeling the feature vector based on the response of that query/response pair and any computer interactions correlated to that query/response pair;
training a model for that topic cluster using the label feature vectors generated from the transcripts of that topic cluster,
wherein each trained model for a topic cluster identifies responses and robotic process automation (RPA) tasks when provided a query associated with a communication relating to a topic that is similar to the topic of that topic cluster so that the identified responses can automatically be provided and the identified RPA tasks can be automatically performed;
receiving a query by a customer;
generating a feature vector for the received query;
accessing a trained model having been trained using transcripts of communications between customers and agents, wherein the trained model identifies responses and RPA tasks when provided one or more queries;

generating a response and a set of RPA tasks in response to the received query by applying the accessed trained model to the generated feature vector for the received query;

executing, by one or more robotic process agents, at least one RPA task in the generated set of RPA tasks; and sending the generated response to be provided to the customer.

18. The method of claim 17, wherein the trained model has been further trained to comply with a policy, and wherein the policy includes a set of requirements corresponding to an organization.

19. The method of claim 17 further comprising:

identifying a communication medium via which the query is received, wherein the trained model has been further trained to respond to queries received via the communication medium.

20. The method of claim 17 further comprising:

computing a ranking metric value for each model, wherein the models for each topic cluster are ranked according to the computed ranking metric value.

* * * * *